(12) United States Patent
Joshi et al.

(10) Patent No.: US 11,909,262 B2
(45) Date of Patent: Feb. 20, 2024

(54) THERMAL MANAGEMENT FOR GENERATOR/ MOTOR STATORS

(71) Applicant: Hamilton Sundstrand Corporation, Charlotte, NC (US)

(72) Inventors: Ashutosh Joshi, Roscoe, IL (US); Debabrata Pal, Hoffman Estates, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 243 days.

(21) Appl. No.: 17/306,455

(22) Filed: May 3, 2021

(65) Prior Publication Data

US 2021/0351643 A1    Nov. 11, 2021

Related U.S. Application Data

(60) Provisional application No. 63/021,986, filed on May 8, 2020.

(51) Int. Cl.
| H02K 1/20 | (2006.01) |
| H02K 9/19 | (2006.01) |
| H02K 5/20 | (2006.01) |

(52) U.S. Cl.
CPC .............. H02K 1/20 (2013.01); H02K 9/19 (2013.01); *H02K 5/203* (2021.01)

(58) Field of Classification Search
CPC .. H02K 1/20; H02K 9/19; H02K 5/20; H02K 5/203; H02K 5/207
See application file for complete search history.

(56) References Cited

U.S. PATENT DOCUMENTS

| 4,959,570 | A  | 9/1990 | Nakamura et al. |
| 8,928,195 | B2 | 1/2015 | Ohashi et al. |
| 9,748,819 | B2 | 8/2017 | Ko et al. |
| 9,762,106 | B2 | 9/2017 | Gauthier et al. |
| 10,199,907 | B2 | 2/2019 | Lin et al. |

(Continued)

FOREIGN PATENT DOCUMENTS

| CN | 107994735 A | 5/2018 |
| JP | S51134707 A | 11/1976 |

(Continued)

OTHER PUBLICATIONS

Jerin (WO 2018087017) English Translation (Year: 2018).*

(Continued)

*Primary Examiner* — Tulsidas C Patel
*Assistant Examiner* — Robert E Mates
(74) *Attorney, Agent, or Firm* — Locke Lord LLP; Joshua L. Jones; Gabriella D'Angelo

(57) ABSTRACT

An electrical machine assembly includes a stator. The stator includes a core, windings assembled into the core, and a back iron heat exchanger mounted to the core. A first end plate is mounted at a first end of the core and back iron heat exchanger. A second end plate is mounted at a second end of the core and back iron heat exchanger opposite the first end plate. A coolant circuit passes from a coolant inlet in the back iron heat exchanger, through the back iron heat exchanger, into the first end plate, out of the first end plate, through the core, into the second end plate, and out of the second end plate.

13 Claims, 4 Drawing Sheets

(56) References Cited

U.S. PATENT DOCUMENTS

2016/0164374 A1* 6/2016 Yang ..................... H02K 3/527
                                                            310/59
2017/0353089 A1* 12/2017 Nies ..................... H02K 1/146
2019/0123612 A1* 4/2019 Weber ..................... H02K 1/20
2019/0273420 A1* 9/2019 Yasuda ................... H02K 1/20

FOREIGN PATENT DOCUMENTS

| JP | S51150409 U | 12/1976 |
| JP | 2016054591 A | 4/2016 |
| SD | 754575 | 8/1980 |
| WO | WO-2018087017 A1 * | 5/2018 |

OTHER PUBLICATIONS

Extended European Search Report dated Oct. 5, 2021, issued during the prosecution of European Patent Application No. EP 21173127.8.

* cited by examiner

THERMAL MANAGEMENT FOR GENERATOR/ MOTOR STATORS

CROSS REFERENCE TO RELATED APPLICATIONS

This application claims priority to U.S. Provisional Patent Application No. 63/021,986, filed May 8, 2020. The contents of this application are hereby incorporated herein by reference in their entirety.

BACKGROUND

1. Field

The present disclosure relates to electrical machines such as generators and motors, and more particularly to thermal management in electrical machines.

2. Description of Related Art

High power generators and motors generate require considerable cooling in the stator. Stator windings run very hot due to large amounts of heat generated in the stator teeth, yoke, and windings. The greater the power density of the generator or motor, the more considerable the cooling must be to have acceptable reliability/life.

The conventional techniques have been considered satisfactory for their intended purpose. However, there is an ever present need for improved systems and methods for cooling motors and generators. This disclosure provides a solution for this need.

SUMMARY

An electrical machine assembly includes a stator. The stator includes a core, windings assembled into the core, and a back iron heat exchanger mounted to the core. A first end plate is mounted at a first end of the core and back iron heat exchanger in thermal communication with the first end of the core. A second end plate is mounted at a second end of the core and back iron heat exchanger opposite the first end plate in thermal communication with the second end of the core. A coolant circuit passes from a coolant inlet in the back iron heat exchanger, through the back iron heat exchanger, into the first end plate, out of the first end plate, through the core, into the second end plate, and out of the second end plate.

The back iron heat exchanger can include a coolant outlet with a back iron heat exchanger cooling channel providing fluid communication from the coolant inlet of the back iron heat exchanger to the coolant outlet of the back iron heat exchanger. The coolant outlet of the back iron heat exchanger can be connected in fluid communication with a coolant-in port of the first end plate. The coolant-in port of the first end plate can be connected in fluid communication with a coolant-out port in the first end plate. The coolant-out port of the first end plate can be connected in fluid communication with a cooling channel through the core, which can outlet into a coolant-in port of the second end plate. The second end plate can have a coolant-out port for returning coolant from the stator after circulation through the stator.

A second coolant circuit can pass from the coolant inlet in the back iron heat exchanger, through the back iron heat exchanger, into the second end plate, out of the second end plate, through the core, into the first end plate, and out of the first end plate. A second back iron heat exchanger cooling channel can provide fluid communication from the coolant inlet of the back iron heat exchanger to a second coolant outlet of the back iron heat exchanger. The second coolant outlet of the back iron heat exchanger can be connected in fluid communication with a coolant-in port of the second end plate. A second cooling channel can be included passing through the core, wherein the second end plate includes a coolant-out port in fluid communication with the second cooling channel through the core.

A spray outlet can be connected to the second end plate in fluid communication with the coolant circuit, wherein the spray outlet is directed towards end windings of the stator windings for spraying coolant from the coolant circuit onto the end windings. A second spray outlet can be connected to the first end plate in fluid communication with the second coolant circuit, wherein the spray outlet is directed towards end windings of the windings for spraying coolant from the second coolant circuit onto the end windings.

Each of the first and second end plates can include a plurality of circumferentially spaced apart, circumferentially alternating coolant-in ports and coolant-out ports for fluid communication with a plurality of coolant channels in the back iron heat exchanger and core. A rotor can be mounted within the stator for rotation relative to the stator, wherein the rotor includes rotor windings wound around the rotor poles.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
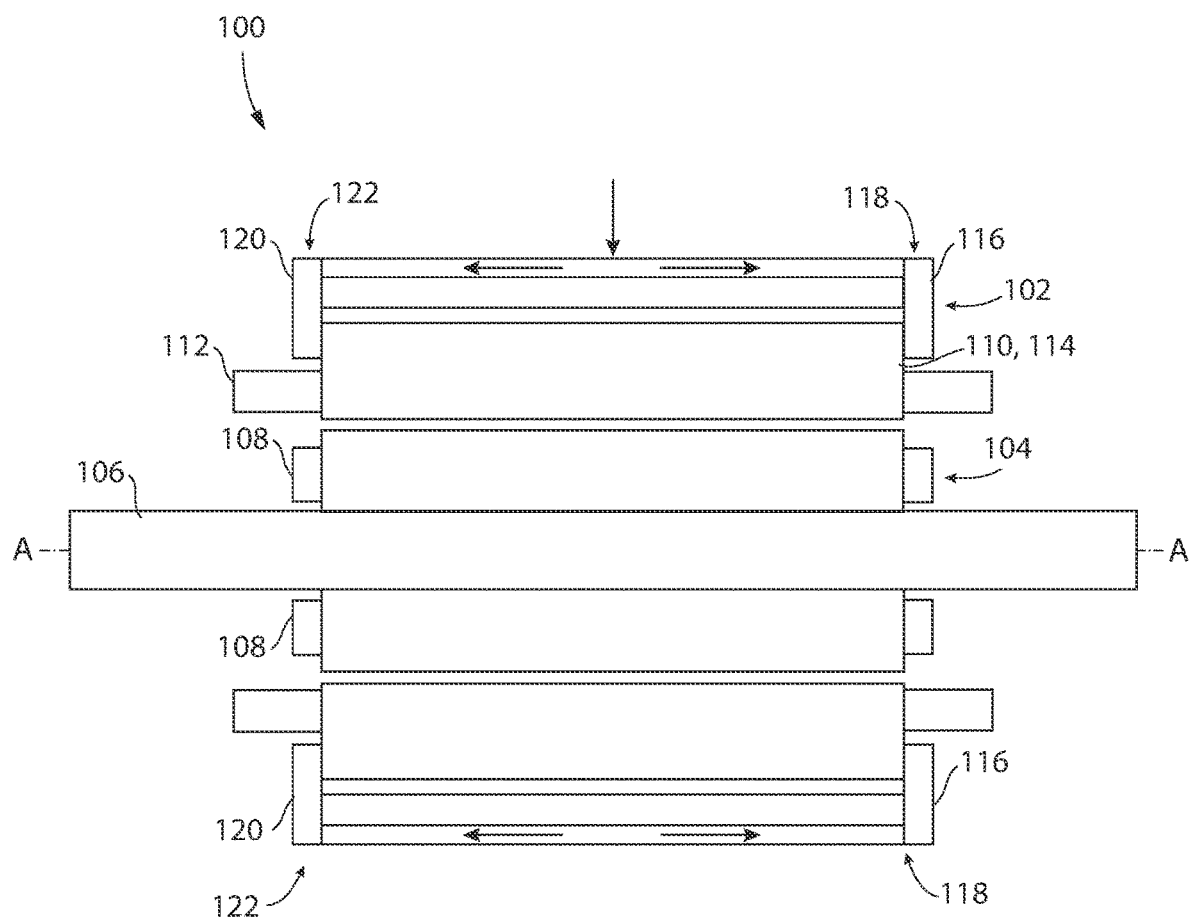
FIG. 1 is a schematic cross-sectional side elevation view of an embodiment of an electrical machine assembly constructed in accordance with the present disclosure, showing the stator and the rotor.

Reference will now be made to the drawings wherein like reference numerals identify similar structural features or aspects of the subject disclosure. For purposes of explanation and illustration, and not limitation, a partial view of an embodiment of an electrical machine assembly in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide stator cooling in electrical machines such as motors and generators.

The electrical machine assembly 100 includes a stator 102. A rotor 104 is mounted within the stator for rotation relative to the stator 102, e.g. about axis A on shaft 106. The rotor 104 includes rotor windings 108. The stator 102 includes a core 110 (identified in FIG. 2), windings 112 assembled into the core 110, and a back iron heat exchanger 114 mounted to the core 110. A first end plate 116 is mounted at a first end 118 of the core 110 and back iron heat exchanger 114. The back iron heat exchanger 114 can be formed, e.g., by machining cooling grooves on the outer diameter of the stator core sleeve or formed by machining cooling grooves on the inner diameter of the generator/motor housing. A second end plate 120 is mounted at a second end 122 of the core 110 and back iron heat exchanger 114 opposite the first end plate 116.

Figure 2:
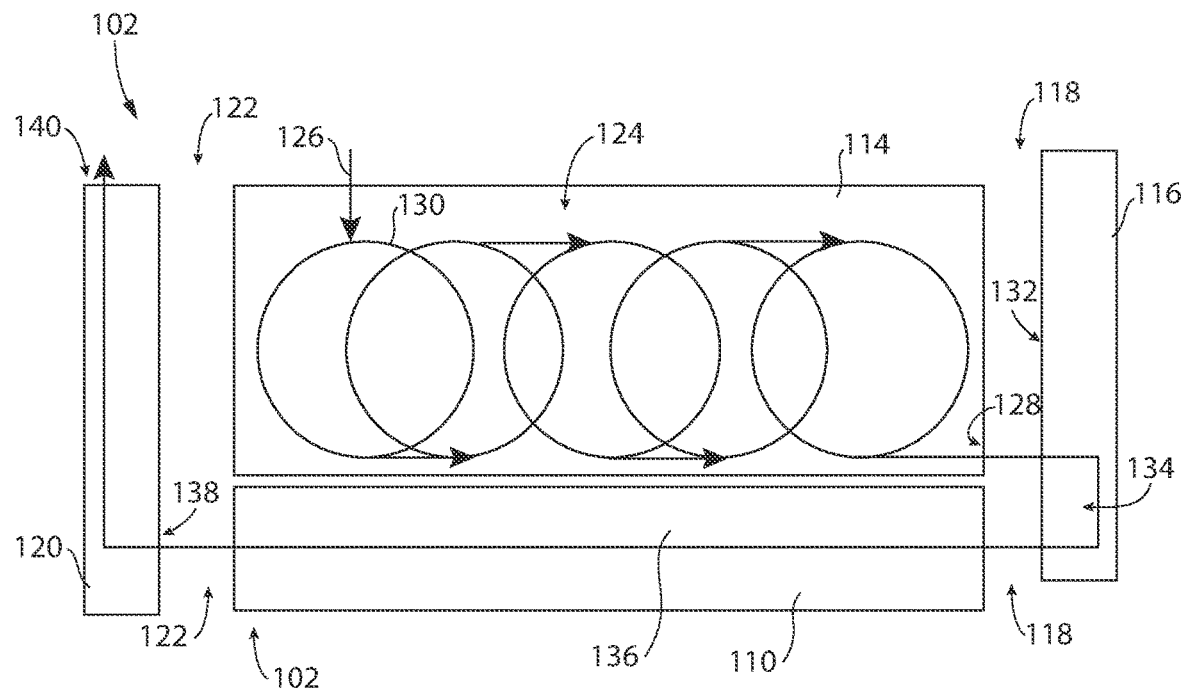
FIG. 2 is a schematic cross-sectional side elevation view of a portion of the assembly of FIG. 1, showing the back iron heat exchanger with a cooling channel.

With reference now to FIG. 2, a coolant circuit 124 passes from a coolant inlet 126 in the back iron heat exchanger 114, through the back iron heat exchanger 114, into the first end plate 116, out of the first end plate 116, through the core 110, into the second end plate 120, and out of the second end plate 120. The back iron heat exchanger 114 includes a coolant outlet 128 with a back iron cooling channel 130 providing fluid communication from the coolant inlet 126 to the coolant outlet 128 of the back iron heat exchanger 114. The coolant outlet 128 of the back iron heat exchanger 114 is connected in fluid communication with a coolant-in port 132 of the first end plate 116. The coolant-in port 132 of the first end plate 116 is connected in fluid communication with a coolant-out port 134 in the first end plate 116. The coolant-out port 134 of the first end plate 116 is connected in fluid communication with a cooling channel 136 through the core 110, which outlets into a coolant-in port 138 of the second end plate 120. The second end plate 120 has a coolant-out port 140 for returning coolant from the stator 102, e.g. to a coolant source, after circulation through the stator 102.

Figure 3:
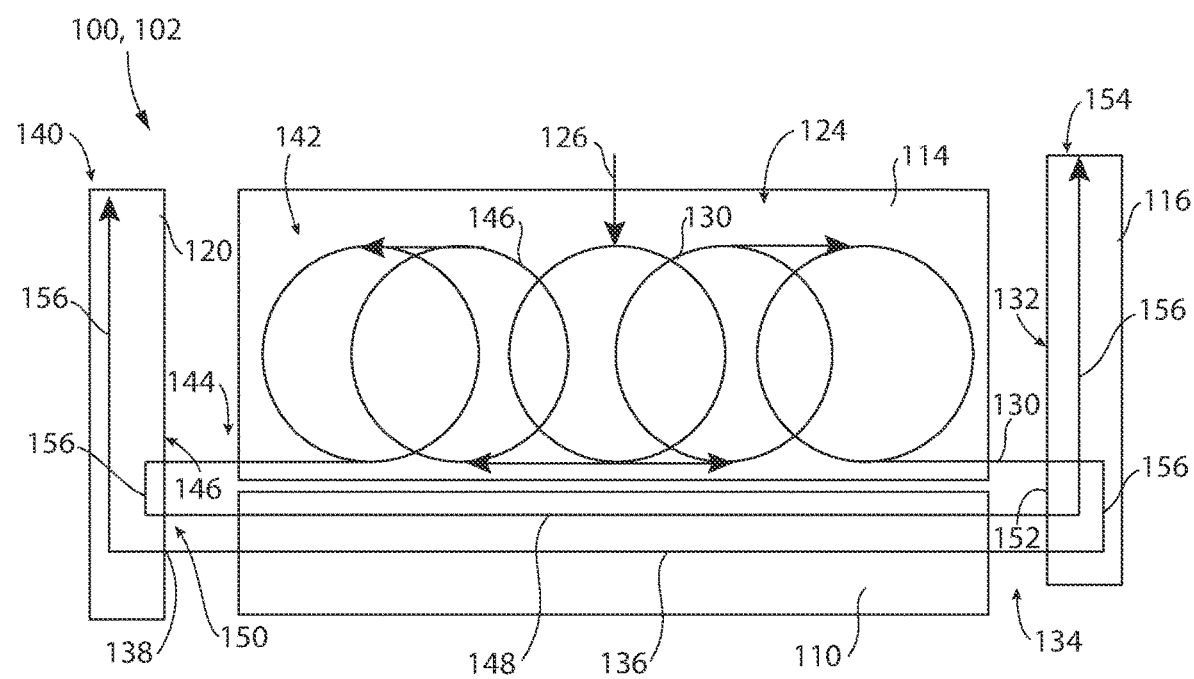
FIG. 3 is a schematic cross-sectional side elevation view of a portion of the assembly of FIG. 1, showing the back iron heat exchanger with two cooling channels.

With reference now to FIG. 3, a second coolant circuit 142 (in addition to the first cooling circuit 130) can be included, which passes from the coolant inlet 126 in the back iron heat exchanger 114, through the back iron heat exchanger 114, into the second end plate 120, out of the second end plate 120, through the core 110, into the first end plate 116, and out of the first end plate 116. Suitable flow conduit features such as tubes can be inserted in the core 110 to retain the flow within the tube so coolant oil does not leak between the core lamination layers. A second back iron cooling channel 146 provides fluid communication from the coolant inlet 126 of the back iron heat exchanger 114 to the second coolant outlet 144 of the back iron heat exchanger 114. The second coolant outlet 144 of the back iron heat exchanger 114 is connected in fluid communication with a coolant-in port 146 of the second end plate 120. A second cooling channel 148 is included passing through the core 110. The second end plate 120 includes a coolant-out port 150 in fluid communication with the second cooling channel 148 through the core 110. A second coolant-in port 152 in the first end plate 116 is in fluid communication with the second cooling channel 148 of the core 110, for fluid communication of coolant from the core 110 out the coolant-out port 154 of the first end plate 116 to return used coolant, e.g. to a coolant source. The end plates 116, 120 are in good thermal contact with the ends of the stator core 110.

Figure 4:
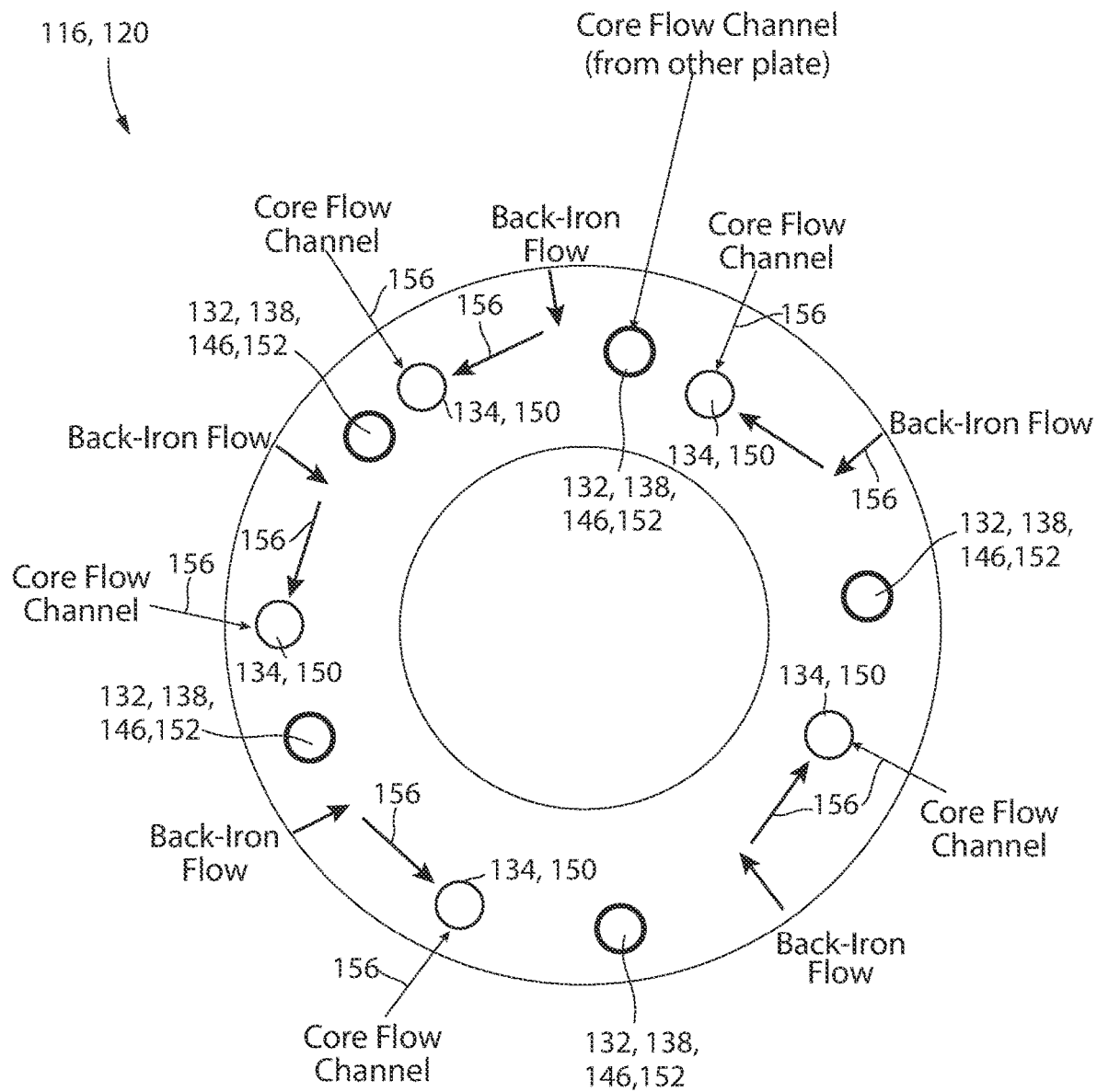
FIG. 4 is a schematic axial end elevation view of one of the end plates of the assembly of FIG. 1, showing the in ports and out ports.

As shown in FIG. 4, each of the first and second end plates 116, 120 includes a plurality of circumferentially spaced apart, circumferentially alternating coolant-in ports 132, 138, 146, 152 and coolant-out ports 134, 150 for fluid communication with a plurality of coolant channels in the back iron heat exchanger 114 and core 110. This allows for multiple cooling circuits 124, 142 spaced circumferentially around the stator 102 (e.g. including circuits 124, 142 out of the viewing plane of FIGS. 1-3). As shown in FIG. 3, passages 156 provide for fluid communication within each of the respective end plates 116, 120 between the respective coolant-in and coolant-out ports 132, 134, 152, 154, 138, 140, 146, 150.

Figure 5:
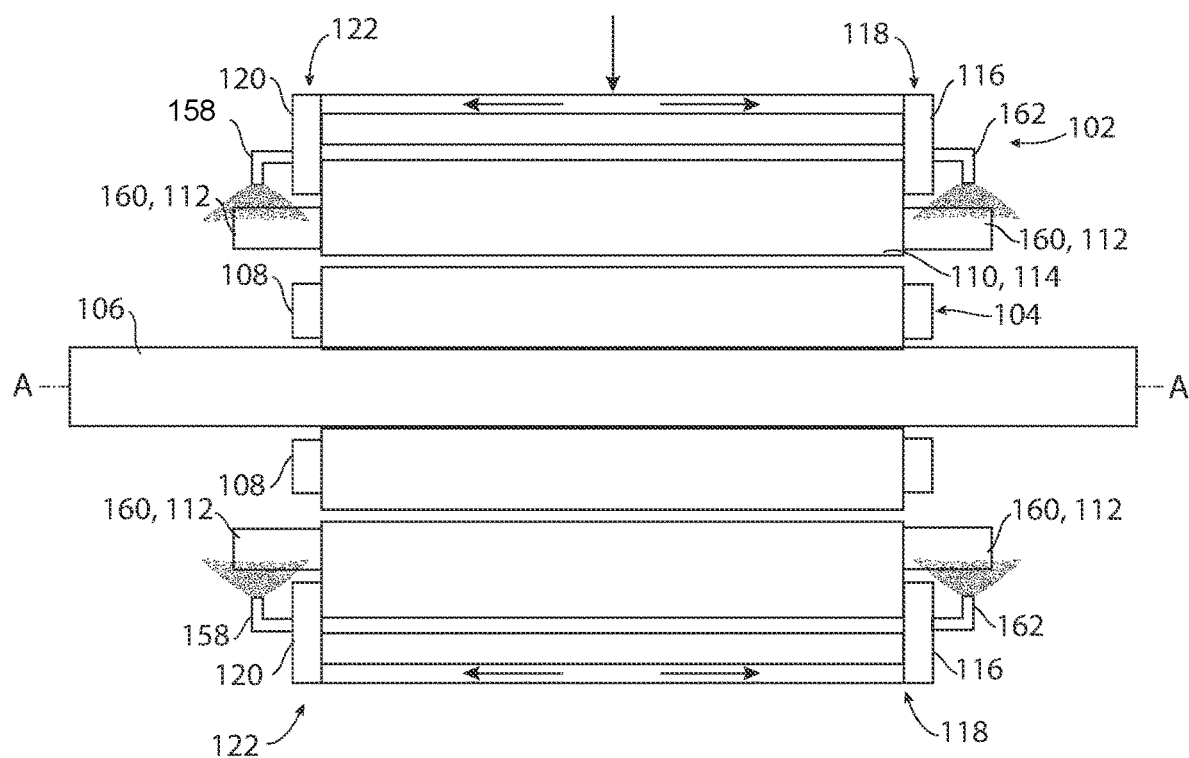
FIG. 5 is a schematic cross-sectional side elevation view of the system of FIG. 1, showing spray outlets for end winding cooling, with the spray indicated by stippling.

With reference now to FIG. 5, optionally a spray outlet 158 can be connected to the second end plate 120 in fluid communication with the coolant circuit 124 (labeled in FIG. 2), wherein the spray outlet 158 is a nozzle or spray orifice that is directed towards end windings 160 of the windings 112 for spraying coolant from the coolant circuit 124 onto the end windings 160. A second spray outlet 162 is connected to the first end plate 116 in fluid communication with the second coolant circuit 142 (labeled in FIG. 3), wherein the spray outlet 162 is directed towards end windings 160 of the windings 112 for spraying coolant from the second coolant circuit 142 onto the end windings 160.

Potential benefits of systems and methods as disclosed herein include use of available oil for cooling electric machine stators, using ring cold plates (e.g. end plates 116, 120) on the stator core ends distributes oil and passes oil through the core for additional cooling, and the outlets from the ring cold plates can be directed as an oil spray to end turns to provide additional cooling. It is also contemplated that this cooling approach can result in lower stator winding temperatures due to heat extraction from multiple paths, which can result in improved reliability for higher power output applications.

The methods and systems of the present disclosure, as described above and shown in the drawings, provide for stator cooling in electrical machines such as generators and motors. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical machine assembly comprising:
   a stator including:
      a core;
      windings assembled into the core;
      a back iron heat exchanger mounted to the core;
      a first end plate mounted at a first end of the core and back iron heat exchanger in thermal communication with the first end of the core; and
      a second end plate mounted at a second end of the core and back iron heat exchanger opposite the first end plate in thermal communication with the second end of the core,
   wherein a first coolant circuit passes from a coolant inlet in the back iron heat exchanger, through the back iron heat exchanger, into the first end plate, out of the first end plate, through the core, into the second end plate, and out of the second end plate,
   wherein a second coolant circuit passes from the coolant inlet in the back iron heat exchanger, through the back iron heat exchanger, into the second end plate, out of the second end plate, through the core, into the first end plate, and out of the first end plate, wherein the first and second coolant circuits have no other inlet into the back iron heat exchanger besides the coolant inlet.

2. The electrical machine as recited in claim 1, wherein the back iron heat exchanger includes a coolant outlet with a back iron heat exchanger cooling channel providing fluid communication from the coolant inlet of the back iron heat exchanger to the coolant outlet of the back iron heat exchanger.

3. The electrical machine as recited in claim 2, wherein the coolant outlet of the back iron heat exchanger is connected in fluid communication with a coolant-in port of the first end plate.

4. The electrical machine as recited in claim 3, wherein the coolant-in port of the first end plate is connected in fluid communication with a coolant-out port in the first end plate.

5. The electrical machine as recited in claim 4, wherein the coolant-out port of the first end plate is connected in fluid communication with a cooling channel through the core, which outlets into a coolant-in port of the second end plate.

6. The electrical machine as recited in claim 5, wherein the second end plate has a coolant-out port for returning coolant from the stator after circulation through the stator.

7. The electrical machine as recited in claim 2, wherein the coolant outlet of the back iron heat exchanger is a first coolant outlet of the back iron heat exchanger, wherein the back iron heat exchanger cooling channel is a first back iron heat exchanger cooling channel, and further comprising:
 a second coolant outlet of the back iron heat exchanger with a second back iron heat exchanger cooling channel providing fluid communication from the coolant inlet of the back iron heat exchanger to the second coolant outlet.

8. The electrical machine as recited in claim 7, wherein the second coolant outlet of the back iron heat exchanger is connected in fluid communication with a coolant-in port of the second end plate.

9. The electrical machine as recited in claim 5, wherein the cooling channel through the core is a first cooling channel through the core, and further comprising a second cooling channel through the core, wherein the second end plate includes a coolant-out port in fluid communication with the second cooling channel through the core.

10. The electrical machine as recited in claim 1, further comprising a spray outlet connected to the second end plate in fluid communication with the first coolant circuit, wherein the spray outlet is directed towards end windings of the windings for spraying coolant from the first coolant circuit onto the end windings.

11. The electrical machine as recited in claim 1, further comprising a spray outlet connected to the first end plate in fluid communication with the second coolant circuit, wherein the spray outlet is directed towards end windings of the windings for spraying coolant from the second coolant circuit onto the end windings.

12. The electrical machine as recited in claim 1, wherein each of the first and second end plates includes a plurality of circumferentially spaced apart, circumferentially alternating coolant-in ports and coolant-out ports for fluid communication with a plurality of coolant channels in the back iron heat exchanger and core.

13. The electrical machine as recited in claim 1, further comprising a rotor mounted within the stator for rotation relative to the stator, wherein the rotor includes rotor windings.

* * * * *